Patented July 19, 1927.

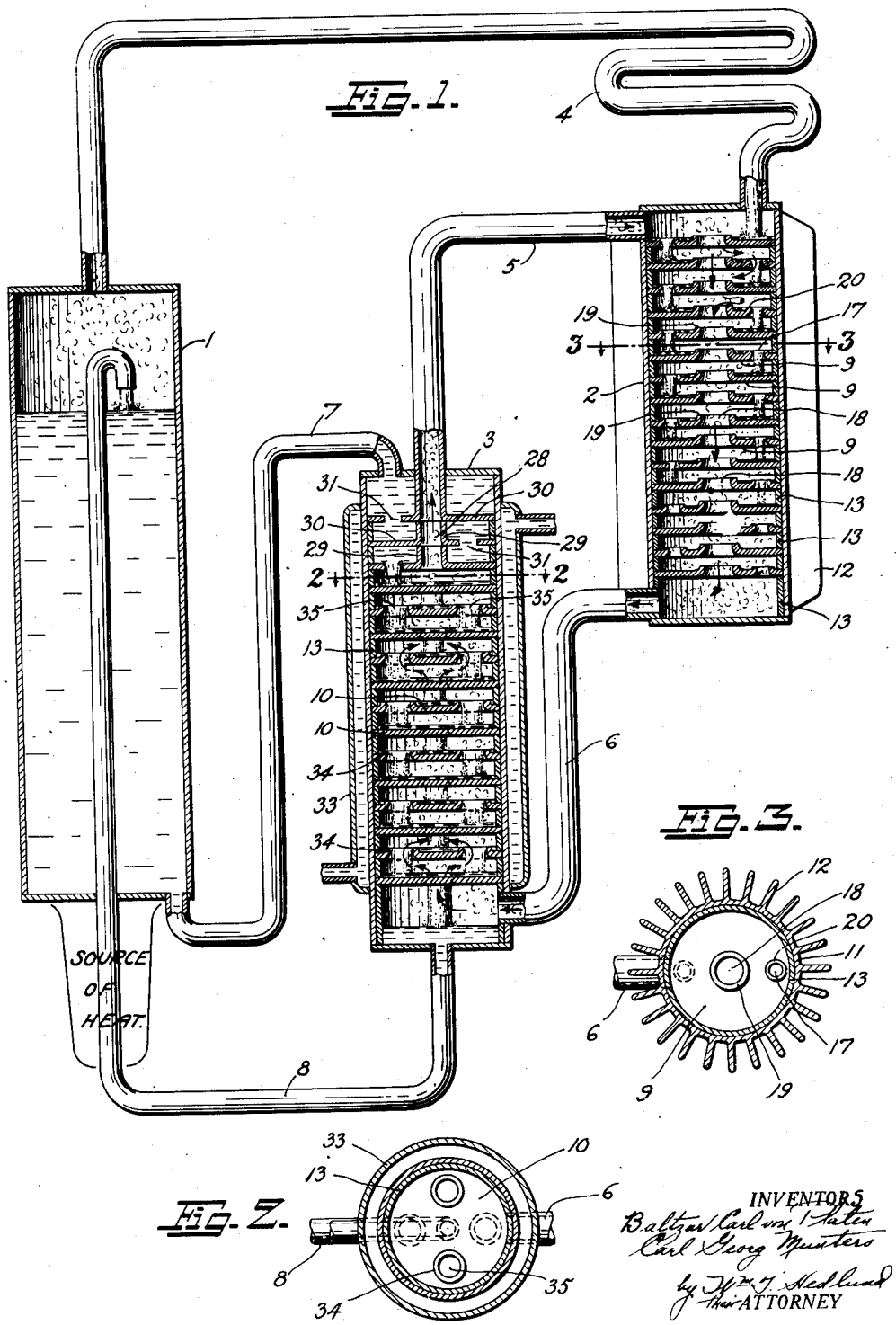

1,636,115

UNITED STATES PATENT OFFICE.

BALTZAR CARL von PLATEN, OF YSTAD, AND CARL GEORG MUNTERS, OF DALA-JARNA, SWEDEN, ASSIGNORS, BY MESNE ASSIGNMENTS, TO ELECTROLUX SERVEL CORPORATION, A CORPORATION OF DELAWARE.

REFRIGERATING APPARATUS OF THE ABSORPTION TYPE.

Application filed March 20, 1925, Serial No. 17,035, and in Sweden March 29, 1924.

The object of the invention is to provide novel and efficient absoption and evaporation apparatus for refrigerating systems of the absorption type utilizing an equalizing inert gas.

The invention will be described with reference to the accompanying drawing on which: Fig. 1 is a cross-sectional elevational view embodying the invention; Fig. 2 is a cross section looking downwardly, taken on line 2—2, Fig. 1; and Fig. 3 is a similar section taken on line 3—3, Fig. 1.

The refrigerating apparatus according to Fig. 1 consists principally of a generator 1, an evaporator 2 and an absorber 3. The generator 1 contains the cooling agent, for instance ammonia dissolved in water, whereas the evaporator 2 and the absorber 3 contain a gas which is inert with respect to the cooling agent and insoluble or sparingly soluble in the absorption liquid, and which may consist for instance of hydrogen. The gas chamber of the generator is connected by means of a condenser coil 4 with the upper part of the evaporator 2 which in turn communicates at the top and at the bottom with the absorber by means of pipes 5 and 6. The generator and the absorber are connected with one another by means of pipes 7 and 8 so as to form a closed circulating system for the absorption liquid. The evaporator 2 and the absorber 3 each contain a number of disks 9 and 10 respectively consisting of heat conducting, preferably metallic, material, each vessel being divided up by said disks into a number of intermediate spaces communicating with one another by means of perforations provided in each disk in such a manner that the liquefied cooling agent supplied to the evaporator from the condenser 4 and the absorption liquid supplied to the absorber through the pipe 7 are caused to spread over the disks of the corresponding vessels, while the liquids pour down from one disk to another.

The mode of action of the apparatus is as follows. Upon heating the generator, ammonia is expelled from the liquid and caused to flow from the generator through the condenser 4 to the evaporator 2. The ammonia is condensed in the condenser so as to reach the evaporator in a liquid condition. As the liquid ammonia flows down over the different disks 9 it spreads over the disks to form large evaporating surfaces, thus furthering the evaporation, and the vapors thus expand and mix with the hydrogen. Owing to the evaporation of the liquid ammonia and its diffusion into the hydrogen, heat is absorbed from the surroundings of the evaporator through the medium of the heat conducting disks 9. As the ammonia vapors are heavier than the hydrogen, the mixture of ammonia and hydrogen flows through the pipe 6 into the lower part of the absorber 3, where it is brought into contact with the liquid circulating through the absorber, the ammonia but not the hydrogen being then dissolved in the liquid. The ammonia is thus separated out, while the hydrogen rises through the absorber and returns to the evaporator through the pipe 5. On entering the evaporator the hydrogen again mixes with ammonia vapors. In this manner the circulation of the inert gas is automatically maintained, mainly on account of the difference between the specific weights of the different gases. The perforations of the disks 9 and 10 are arranged so as to cause the gas mixture passing through the evaporator and the absorber to sweep over the surfaces of the plates thus bringing the gases in close contact with the liquid pouring down.

The liquid circulation takes place in the following manner: The liquid contents of the absorber, which is rich in ammonia, is returned to the generator through the conduit 8, whereas the liquid scanty of ammonia is supplied to the absorber through the conduit 7. The circulation is maintained exclusively by means of the thermal relation between the circulating system and the generator, in that the liquid is heated in that part of the pipe 8 which extends through the generator, the intense development of ammonia gas within the pipe 8 then serving to force the liquid to such a level in the generator, as will be necessary to attain a sufficient pressure head relative to the absorber.

The evaporator 2 comprises a cylindrical shell 11 provided externally with radially diverging heat exchanging ribs 12 (Fig. 3). The plates or disks 9 within the evaporator 2 are spaced apart and separated from the bottom of the evaporator by spacing cylinders or rings 13. In order to obtain an efficent transfer of heat between the shell 11 and the plates 9, the plates and cylinders 13 are shrunk into contact with the shell. In assembling the various parts which go to make up the evaporator, the shell 11 is heated while the cylinders 13 and the plates 9 are arranged in proper positions relative to each other, the diameter of the circular plates 9 being so chosen that the edges of the disks press tightly against the shell upon subsequent cooling of the shell.

Each plate or disk 9 is provided with a circular aperture or hole 18, the edges of the hole being bent upwardly to form rims or flanges 19 which prevent liquid from pouring down therethrough. Each plate 9 is also provided with a hole 17 for the passage of liquid, holes 17 being formed with raised rims or flanges 20 which serve to maintain a pool of liquid on each disk, causing the liquid to spread over the whole upper surface of the plate before it can pour down through hole 17. Flanges 19 are made somewhat higher than flanges 20. The circular holes 18 form a straight central vertically extending passageway for flow of gas. Holes 17 form a tortuous passageway for liquid, the holes of proximate plates being arranged vertically out of alignment for this purpose. In the embodiment shown in Fig. 1 these holes are arranged at 180° with respect to the hole of the next adjacent plate. A close contact between the gases and liquid is obtained in consequence of the whirling or gyrating movement of the gas in the spaces between the plates, produced by the action of the fluids passing through the holes.

The absorber is provided with plates or disks 10 more or less similar to those used in the evaporator. The plates in the absorber are likewise spaced by means of rings 13 which, together with the circular plates 10, are shrunk into contact with the shell of the absorber. The plates in the absorber are formed each with two diametrically opposed holes 35, each hole having an upwardly extending rim or flange 34 to cause liquid to collect on the disk and form a pool as in the evaporator. Adjacent disks are arranged with the holes out of alignment whereby a zigzag flow of gas upwardly through the absorber and of liquid downwardly through the absorber is obtained.

The upper part of the absorber is provided with a central passage 28 for the inert gas, which passage is separated from the surrounding space by cylindrical flanges 29 formed on to the upper disks 30. These upper disks 30 are provided with diametrically opposed holes 31 and form, together with the shell and spacing rings and flanges 29, a chamber separate from the absorption space of the absorber, in which chamber, the absorption liquid entering the absorber is cooled by means of the surrounding cooling jacket 33 before entering the absorption space of the absorber. The cooling jacket 33, as is illustrated, surrounds the absorber and serves to abstract heat from the same.

Liquid from the generator enters the absorber through pipe 7 and flows downwardly in a zigzag path first through holes 31 in the upper disks 30 and then through holes 35 in the disks 10. The gas mixture entering the absorber through conduit 6 passes in a tortuous path through the disks 10 in close contact with the liquid, the ammonia contained in the mixture being absorbed by the absorption liquid, while the inert gas passes upwardly through the central passage 28 without coming into contact with the hot liquid entering through pipe 7. This arrangement prevents vapors from forming in the upper part of the absorber and mixing with the inert gas and being carried into the evaporator together with the inert gas.

While we have described one embodiment of our invention, it is to be understood that the invention is not limited to the construction and arrangement of parts shown and described.

We claim:

1. A refrigerator comprising a generator, a condenser, an evaporator and an absorber connected to form a system in which a cooling agent and an auxiliary agent circulate through the evaporator, said evaporator containing a plurality of superimposed spaced metal plates having holes in the same, some of the holes forming a straight vertically extending passageway for flow of gas and other holes being out of alignment with respect to each other to form a tortuous line of flow for liquid.

2. A refrigerator comprising a generator, a condenser, an evaporator and an absorber connected to form a system in which a cooling agent and an auxiliary agent circulate through the evaporator, said evaporator containing a plurality of superimposed spaced metal plates having holes in the same, some of the holes being aligned and forming a straight vertically extending passageway for flow of gas and other holes being out of alignment with respect to each other to form a tortuous line of flow, raised relatively high flanges surrounding the aligned holes and raised relatively low flanges surrounding the holes for flow of liquid.

3. A refrigerator comprising a generator, a condenser, an evaporator and an absorber connected to form a system in which a cooling agent and an auxiliary agent circulate through the evaporator and the auxiliary agent circulates through the absorber, said absorber and evaporator containing a series of super-imposed plates having holes in the same, some of the holes in the plates of the evaporator forming a straight vertically extending passageway for flow of gas and other holes being out of alignment with respect to each other to form a tortuous line of flow for liquid.

4. A refrigerator comprising a generator, a condenser, an evaporator and an absorber connected to form a system in which a cooling agent and an auxiliary agent circulate through the evaporator and the auxiliary agent circulates through the absorber, said absorber and evaporator containing a series of super-imposed plates having holes in the same, some of the holes in the plates of the evaporator forming a straight vertically extending passageway for flow of gas and other holes being out of alignment with respect to each other to form a tortuous line of flow for liquid and raised relatively high flanges surrounding the aligned holes and raised relatively low flanges surrounding the holes for flow of liquid.

5. A refrigerator including a generator for vaporizing a cooling agent from a solution thereof in an absorption liquid, a condenser for the cooling agent communicating with said generator, an evaporator communicating with said condenser and containing an inert gas and wherein liquid formed in the condenser is vaporized, a series of superimposed spaced metal plates in said evaporator, said plates having holes in the same and raised flanges surrounding said holes to permit the formation of pools of liquid upon said plates, some of said holes being arranged to form a straight vertically extending passageway for flow of gas and other holes being arranged vertically out of alignment with respect to holes of adjacent plates, the flanges surrounding the holes forming a vertically extending passageway being higher than the flanges surrounding the holes out of alignment, whereby gas can flow through said passageway and liquid may pour through the holes which are out of alignment from one plate downwardly into the pool which may be formed upon the next lower plate, an absorber, connections between said absorber and generator whereby the absorption liquid circulates through the generator and absorber under the influence of heat applied thereto and connections between said evaporator and absorber whereby the mixture of vapor and gas formed in the evaporator flows to the absorber and said gas returns to said evaporator by reason of the difference in specific weights of the mixture of vapor and gas in the evaporator and of the gas in the absorber after the vapor has been absorbed by the absorption liquid.

In testimony whereof we affix our signatures.

BALTZAR CARL v. PLATEN.
CARL GEORG MUNTERS.